(12) United States Patent
Jones

(10) Patent No.: US 8,755,781 B2
(45) Date of Patent: *Jun. 17, 2014

(54) EVENT AND DATA MANAGEMENT SYSTEM AND METHOD

(75) Inventor: David S. Jones, Grapevine, TX (US)

(73) Assignee: Cardlab, Inc., Grapevine, TX (US)

( * ) Notice: Subject to any disclaimer, the term of this patent is extended or adjusted under 35 U.S.C. 154(b) by 934 days.

This patent is subject to a terminal disclaimer.

(21) Appl. No.: 12/854,000

(22) Filed: Aug. 10, 2010

(65) Prior Publication Data

US 2010/0303020 A1    Dec. 2, 2010

Related U.S. Application Data

(63) Continuation of application No. 11/606,654, filed on Nov. 29, 2006, now Pat. No. 7,773,980.

(60) Provisional application No. 60/758,861, filed on Jan. 13, 2006.

(51) Int. Cl.
*H04M 3/00* (2006.01)

(52) U.S. Cl.
USPC ........ 455/418; 455/408; 455/414.1; 455/416; 455/456.2; 370/260; 370/263; 370/270; 370/328; 379/93.21; 379/158; 379/202.01; 709/203; 709/205; 705/5; 705/7.11; 705/7.21

(58) Field of Classification Search
USPC ................... 455/408, 414.1, 416, 456.2, 418; 379/93.21, 158, 202.01; 370/260, 263, 370/270, 338; 705/8–9, 5, 7.11, 7.21; 709/203–205

See application file for complete search history.

(56) References Cited

U.S. PATENT DOCUMENTS

| | | | |
|---|---|---|---|
| 5,303,145 | A | 4/1994 | Griffin et al. |
| 6,035,278 | A | 3/2000 | Mansour |
| 6,636,888 | B1 | 10/2003 | Bookspan et al. |
| 7,024,174 | B2 | 4/2006 | Nagy et al. |
| 7,027,995 | B2 | 4/2006 | Kaufman et al. |
| 7,113,797 | B2 | 9/2006 | Kelley et al. |
| 7,184,524 | B2 | 2/2007 | Digate et al. |
| 7,343,312 | B2 | 3/2008 | Capek et al. |
| 7,379,733 | B2 | 5/2008 | Maes et al. |
| 2003/0182375 | A1 | 9/2003 | Zhu et al. |
| 2006/0045030 | A1 | 3/2006 | Bieselin |

*Primary Examiner* — Steve D Agosta
(74) *Attorney, Agent, or Firm* — Jackson Walker L.L.P.; Christopher J. Rourk

(57) ABSTRACT

A method for transferring data based on an event function is provided. The method includes receiving an event function from an event initiator. The event function is distributed to one or more destinations associated with event performers. A response message is received as a function of destination and time. It is determined whether the time is less than or equal to a limit time, and it is further determined whether an event parameter is greater than or equal to an event constant if the time is less than or equal to the limit time. Data is transferred from a data origination system accessible by the event initiator to a data destination system accessible by the event performer if the event parameter is greater than or equal to the event constant and if the time is less than or equal to the limit time.

6 Claims, 4 Drawing Sheets

FIGURE 1    100

EVENT AND DATA MANAGEMENT SYSTEM AND METHOD

CROSS-REFERENCE TO RELATED APPLICATIONS

This is a continuation of U.S. patent application Ser. No. 11/606,654, filed Nov. 20, 2006, and entitled "EVENT AND DATA MANAGEMENT SYSTEM AND METHOD," which claims the benefit of U.S. Provisional Patent Application Ser. No. 60/758,861, filed Jan. 13, 2006, and entitled "PARENT-CHILD ALLOWANCE AND CHORE COMPENSATION MANAGEMENT SYSTEM," which are hereby incorporated by reference for all purposes.

FIELD OF THE INVENTION

The present invention pertains to the field of event and data management, and more specifically to a system for event and data management that allows data associated with events to be managed.

BACKGROUND OF THE INVENTION

Prior art systems for managing data and prior art systems for managing events are known in the art. Such systems allow parties to store and retrieve data and send data messages, or to associate data with events for review by other parties, respectively. Nevertheless, because of the complexity of such systems, relatively simple rules must be applied.

For example, email and event scheduling systems are known that allow individuals to schedule events and to generate a message upon scheduling of the event. However, such systems do not allow a message based on a destination, a time or user defined event parameters to be generated. For example, a user can either accept or decline an invitation to an event using an email and scheduling system, but no subsequent transfer of data to the user then occurs, much less a transfer of data based on the destination of the user, a time associated with the user's acceptance or declination, or the value of other user-defined parameters. Indeed, there is no recognition in the art of the benefits of such additional functionality.

SUMMARY OF THE INVENTION

In accordance with the present invention, a system and method for event and data management are provided that allow a destination, time, and user defined variables to be associated with messages that allow subsequent data transfers to be defined.

In accordance with an exemplary embodiment of the present invention, a method for transferring data based on an event function is provided. The method includes receiving an event function from an event initiator. The event function is distributed to one or more destinations associated with event performers. A response message is received as a function of destination and time. It is determined whether the time is less than or equal to a limit time, and it is further determined whether an event parameter is greater than or equal to an event constant if the time is less than or equal to the limit time. Data is transferred from a data origination system accessible by the event initiator to a data destination system accessible by the event performer if the event parameter is greater than or equal to the event constant and if the time is less than or equal to the limit time.

The present invention provides many important technical advantages. One important technical advantage of the present invention is a system for event and data management that allows messages responsive to predetermined variables to be generated in response to an event and a message, so as to provide for additional data transfers based on variables associated with a message, such as a destination (e.g. where the message was sent), a time (e.g. how much time passed before a response was generated), or user defined variables.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
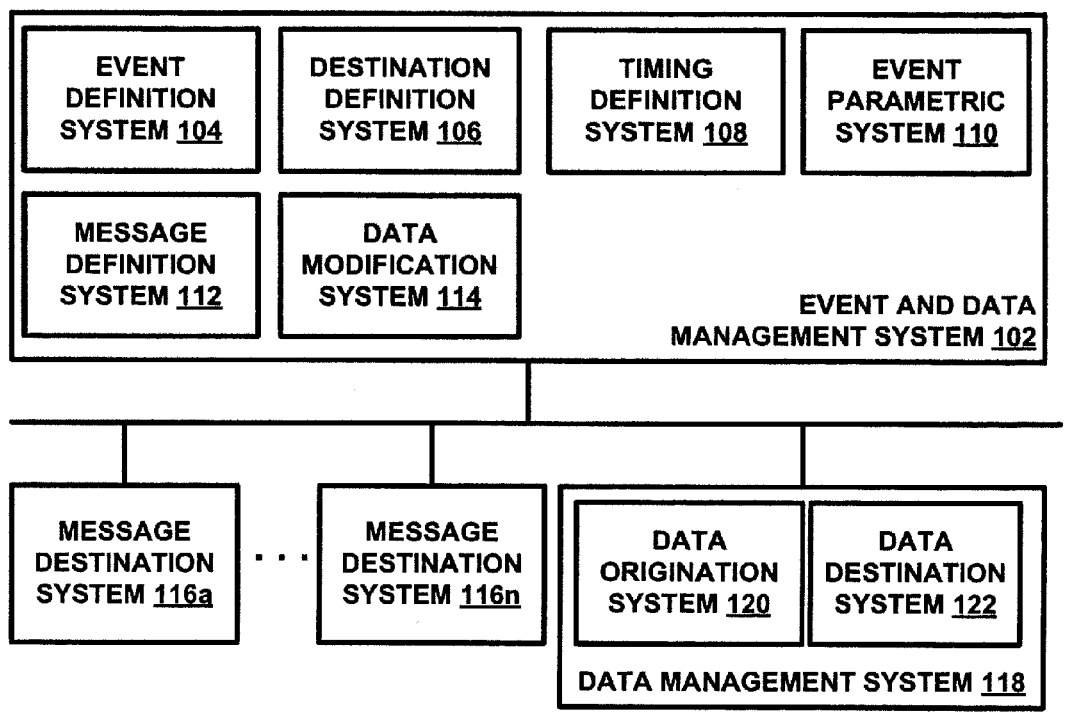
FIG. 1 is a diagram of a system for event and data management in accordance with an exemplary embodiment of the present invention.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of system 100 for event and data management in accordance with an exemplary embodiment of the present invention. System 100 allows event and data management to be performed, such as where data is generated or transferred concurrent with performance of events.

System 100 includes event and data management system 102, which further comprises event definition system 104, destination definition system 106, timing definition system 108, event parametric system 110, message definition system 112, and data modification system 114, each of which can be implemented in hardware, software, or a suitable combination of hardware and software, and which can be one or more software systems operating on a general purpose processing platform. As used herein, a hardware system can include discrete semiconductor devices, an application-specific integrated circuit, a field programmable gate array, a general purpose processing platform, or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Event definition system 104 allows an event to be defined. In one exemplary embodiment, an event can be defined in terms of numerical parameters such as a time T, a destination D, a completion variable X, or other suitable data. Event definition system 104 allows a user to define an event such that the event can then be processed by system 100 according to the functional parameters that define the event. In one exemplary embodiment, an event can include the entry of a mobile wireless device into the operational range of a local wireless network, such as a Bluetooth or 802.X network, where active mobile wireless devices are detected by a base station or other suitable system.

Destination definition system 106 allows a destination for a message to be defined. In one exemplary embodiment, event definition system 104 can identify destinations to allow the event definition data to be provided to such predetermined destinations, whereas the information required to transmit the event definition data to the destination can be stored in destination definition system, 106. Likewise, destinations between messages can be defined in destination definition system 106. In another exemplary embodiment, a destination can include a mobile wireless device in a local wireless network, such as where the entry and exit of such devices may occur over a short period of time, or where such devices may enter the local wireless network and remain for a period of time to use data access services or for other purposes.

Timing definition system 108 allows timing parameters to be set for events. In one exemplary embodiment, timing can be measured by a predetermined reference clock, and durations for events can be determined based on a difference in time between the start and completion of an event, between the time an event is assigned and the time an event is completed, between an absolute deadline, between a preferred deadline and an absolute deadline, or in other suitable manners. In one exemplary embodiment, a timing definition system 108 can allow a limit time to be defined as well as a completion time to be defined, such as where the limit time is the absolute maximum time for which an event can occur by and the completion is a preferred time by which an event can be completed by. In another exemplary embodiment, the time limits can be associated with mobile wireless devices in a local wireless network, such as where data access is provided to the mobile wireless device for a predetermined period of time equal to the limit time, where the amount of time that a mobile wireless device is expected to stay within a local wireless network varies between the limit time and a variable time constant, such as one that is based on profile data or ongoing empirical measurements, or other suitable data.

Event parametric system 110 allows one or more parameters to be defined for, an event. In one exemplary embodiment, completion of an event can be determined by a suitable parameter such as a task defined by quantity of materials processed, transportation of materials, a type of processing of materials, objective quality indicia such as a number of observable defects, or other suitable parametric data. In another exemplary embodiment, event parameters can be defined by a user profile associated with a mobile wireless device. In this exemplary embodiment, entry of the mobile wireless device into a local wireless network can prompt retrieval of a user profile associated with the user device, and event parameters can be assigned based on the user profile, such as whether to transmit a coupon or incentive to the user, whether to grant data access to the user, or other event parameters. Likewise, event parameters can be combined in sequence, such as where transfer of the coupon or incentive is based on completion of a prior event.

Message definition system 112 allows messages to be defined that are used in events, such as event initiation messages, event completion messages, or other suitable messages. In one exemplary embodiment, messages can be defined that are transmitted between an event initiator and an event performer, an event initiator and a system for event and data management, an event performer and an event initiator, an event performer and a system for event and data management, or other suitable messages. In another exemplary embodiment, messages can be defined for transmission to a mobile wireless device in a local wireless network, such as to determine whether the device is still present in the network, to determine whether a user is using the device, to provide a coupon or incentive to the user, or for other suitable purposes.

Data modification system 114 allows data messages to be modified based upon event completion data. In one exemplary embodiment, data modification system 114 can include predetermined data message modification parameters that modify a data message based upon a time parameter, an event parameter, or other suitable data. In another exemplary embodiment, data modification system 114 can modify a data message based upon mobile wireless device profile data, such as where a standard message that is transmitted to mobile wireless device users without a profile is modified based on profile data for a particular user.

Message destination systems 116a through 116n are used to define messages for transmission between the various systems of system 100. In one exemplary embodiment, message destination system 116a can query event definition system 104 and can generate or define a message based upon predetermined timing, destination, event parameters, message definitions, or other suitable data. Likewise, message destination systems 116a through 116n can be assigned priority so as to allow certain users to modify predetermined fields and other users to modify other predetermined fields. In another exemplary embodiment, a given message destination system 116 can be associated with a profile, such that messages transmitted to that message destination system 116 are configured for the user of that message definition system, response messages are automatically generated based on the user profile, access to data origination system 120 or data destination system 122 is granted based on completion of tasks, the user profile, or other suitable functions can be provided.

Data management system 118 allows data to be managed between a data origination system 120 and a data destination system 122. In one exemplary embodiment, a message comprising data from data origination system 120 can be transmitted to data destination system 122 based upon processing of event definition data by event and data management system 102. For example, an event defined by event definition system 104 may include a definition of data that should be transferred from data origination system 120 to data destination system 122 upon completion of a task, so as to allow a system or user to access data through data destination system 122. Likewise, data modification system 114 can be used to modify the data message transmitted from data origination system 120 to data destination system 122. In another exemplary embodiment, a user of a message destination system 116 may be given a coupon or other data, where the user's profile is stored in data destination system and the coupon or other data is transferred from data origination system 120 to data destination system 122 upon the occurrence of an event, transmission of a message, or in other suitable manners.

In operation, system 100 allows events to be defined in terms of time, destination, and event parameters so as to manage the transfer of data from a data origination system 120 to a data destination system 122. In this manner, parties having access to data on data destination system 122 but not having access to data on data origination system 120 can be given access to the data on data origination system 120 based upon the occurrence of predefined events, such as by transferring data from data origination system 120 to data destination system 122. For example, data destination system 122 may include an account or other data associated with a user of a message destination system 116, and a user of event definition system 104 may define events that will need to be completed before data defining credit, coupons, tickets, controls, messages, or other suitable data is transferred from data origination system 120 to data destination system 122, so as to allow the user of message destination system 116 to access the data. In this manner, the transfer of data can be controlled based upon predetermined objective criteria.

In another exemplary embodiment, an event can include a natural occurrence such as a temperature, rainfall, or other suitable events. Event definition system 104 can be used to define parameters such as a time for the event, a destination or location of the event, and other event parametric data, such as an amount of rainfall, a wind force measurement, or other suitable event parameters. Destination definition system 106 can be used to define one or more destinations that a message regarding the event defined by event definition system 104 should be transferred to. Timing definition system 108 can determine a time associated with the event, such as by determining whether rainfall occurs within a period, the length of period of rainfall, whether a temperature reaches a certain point during a period, the length of which a temperature has been exceeded, or other suitable data. Event parametric system 110 can be used to set one or more event parameters such as to generate a message if rainfall exceeds a certain level, if rainfall exceeds a certain level and the temperature exceeds a certain level and the temperature exceeds a certain level, rainfall exceeds a certain level, the temperature exceeds a certain, and the wind force exceeds a certain level, or other suitable event parameters. Message definition system 112 can be used to define the message that is transmitted to each destination. Data modification system 114 can be used to modify data that is transferred, such as evacuation data, data for controlling the operation of drainage pumps, or other suitable data. Likewise, message destination systems 116a through 116n can receive various messages generated that are generated by event and data management system 102. Message destination system 116a through 116n can then access data origination system 120 and data destination system 122 based upon predetermined access parameters. In one exemplary embodiment, message destination system 116a can have access to data at data origination system 120 but can be restricted from access to data at data destination system 122. Likewise, message destination system 116n can have access to data at data destination system 122 but can be restricted from access to data at data origination system 120. Based on the transfer of messages between message destination system 116a, event and data management system 102, and message destination system 116n, data such as a credit can be transferred from data origination system 120 to data destination system 122, such as to give access to the credit or other data to the user of message destination system 116n and to restrict access to the credit or other data from the user of message destination system 116a. Other suitable embodiments can also or alternatively be used.

In another exemplary embodiment, event definition system 104 can be used to define one or more events that must occur at a predetermined time, must be performed by a predetermined event performer, or that must meet other predetermined criteria. Destination definition system 106 can be used to notify the parties that are responsible for performing the events. Timing definition system 108 can set time parameters during which the event is to be performed, times by which an event should be performed and times after which an event no longer requires performance, or other suitable timing definitions. Event parametric system 110 can be used to identify the event parameters, such as performance of predetermined tasks (painting a building, tilling a field, hauling garbage, or other suitable tasks). Message definition system 112 allows messages to be defined regarding data transfer. Data modification system 114 allows data to be modified based upon event parameters and event definition. Message destination systems 116a through 116n allow messages relating to the event, the performance of the event and the completion of the event to be transferred and also allow access to data through data origination system 120 and data destination system 122. Data origination system 120 can include data that is in the possession of an event organizer, such as compensation data, location data where an event performer should proceed to after completion of an event, or other suitable data. Data destination system 122 can receive the data from data origination system 120 so as to allow a user of message destination system 116a through 116n to retrieve data that has been transferred from data origination system 120 to data destination system 122, and so as to prevent the person transferring the data from data origination system 120 to data destination system 122 from modifying the data after it has been transferred. In this manner, the user of message destination system 166a through 116n that has access to data destination system 122 can access the data that has been transferred without further modification by the user of message destination system 116a through 116n that defined the event and set parameters authorizing the transfer of the data.

Figure 2:
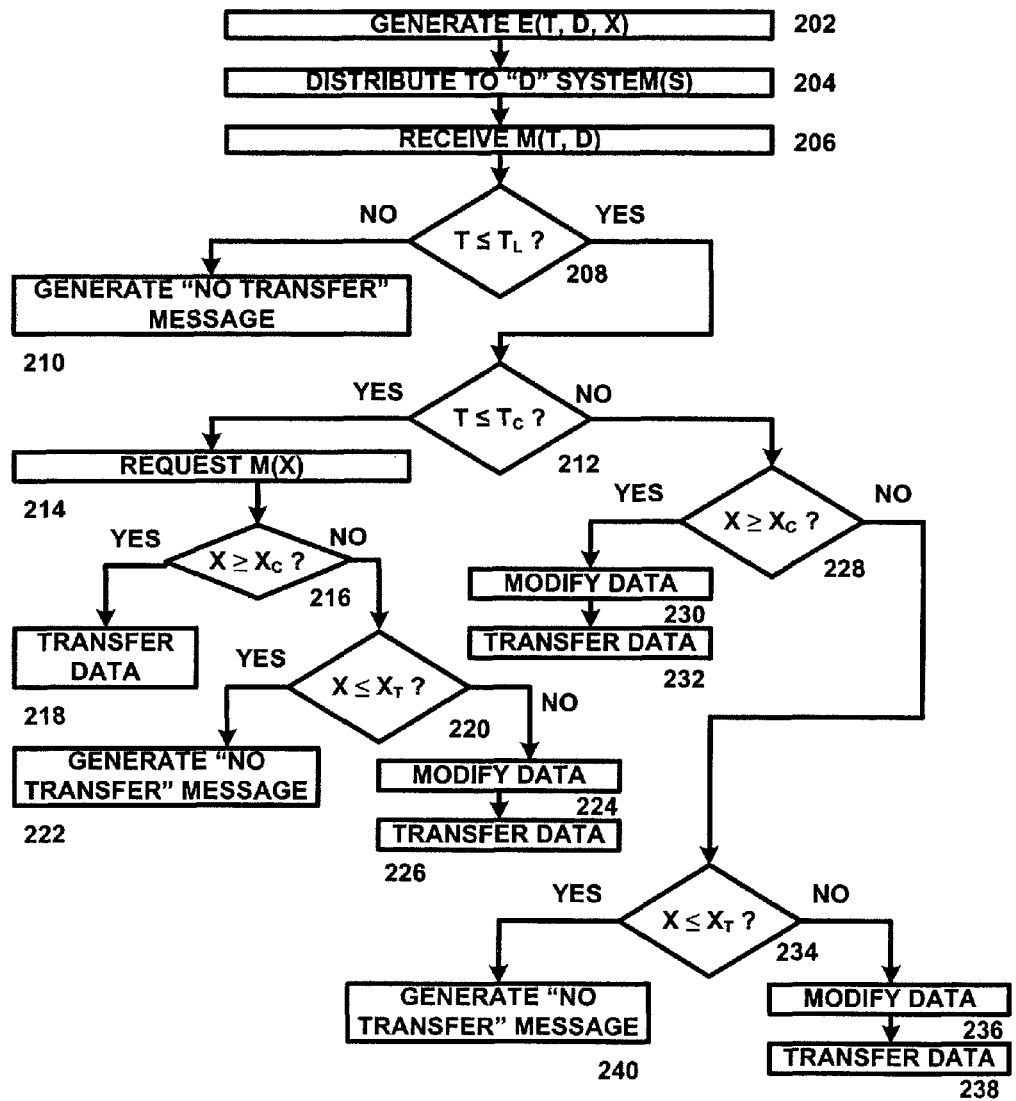
FIG. 2 is a diagram of a method for event and data management in accordance with an exemplary embodiment of the present invention.

FIG. 2 is a diagram of method 200 for event and data management in accordance with an exemplary embodiment of the present invention. Method 200 allows event data to be managed so as to allow events to be defined in terms of variables such as time, destination, and event parameters.

Method 200 begins at 202 where an event function $E(T, D, X)$ is generated. In one exemplary embodiment, the event function can be generated based on a time limit, a time constant that defines when an event should be completed by, tasks that should be performed, quantitative task parameters, and other suitable data. Likewise, a destination for receipt of the event functions can be defined as well as the destination for occurrence of the event, event performers, or other parameters. Parameters "X" can include $X1, X2 \ldots XN$, and can be defined such as an amount of materials to be processed, a time limit for a process to be performed, or other suitable parameters. The method then proceeds to 204.

At 204 the event function is distributed to "D" systems, where "D" is one or more destination variable (e.g., $D1, D2 \ldots DN$) defined as part of the event function. In one exemplary embodiment, distribution to each of the "D" systems can be performed as a function of the event function itself, such as where the event function is transmitted to a first "D" system at a first time, and is then transmitted to a second "D" system at a second time after performance of one or more of the event function parameters. The method then proceeds to 206.

At 206 a message $M(T,D)$ is received. In one exemplary embodiment, the message can include a time that the message was generated, a destination from which the message was generated, and a message to which the message is to be sent. Likewise, other suitable data can be included. In another exemplary embodiment, the message $M(T,D)$ can include a reminder regarding an event E(T, D, X), such as a request for an event performer to perform the event if it has not been performed, to report a performed but unreported event, or other suitable messages. The message can be sent by email, text messaging, voice mail, or in other suitable manners. The method then proceeds to 208.

At 208 it is determined whether a time is less than a time limit. In one exemplary embodiment, if the time is not less than a time limit, then the time has reached an expiration point where the event has terminated, such that no transfer of data should be performed. If the time exceeds the time limit, the method proceeds to 210 where a no transfer message is generated, such that no transfer of data occurs. Likewise, if it is determined that the time is less than or equal to the time limit, the method proceeds to 212.

At 212, it is determined whether the time is less than or equal to a time constant, such as a time at which the event should be completed by. If it is determined that the time is less than the time constant, then the method proceeds to 214 where a message with event parameter data is requested. In one exemplary embodiment, the message with event parameter data can include a request for confirmation that event parameters were met, a request for an amount of an event parameter that was measured, or other suitable data. The method then proceeds to 216.

At 216, it is determined whether the event parameters are greater than or equal to an event constant for each parameter. For example, if the event parameter is an amount of rainfall, then it can be determined whether the amount of rainfall was equal to or greater than an amount. Likewise, if the event was completion of certain processes or predetermined functions it can be determined whether the amount of process performed or the amount of function completed exceeds the predetermined parameters. If it is determined that the event parameters are greater than or equal to the event constant for each parameter at 216, the method proceeds to 218 where data is transferred. In addition, a message can be generated notifying a recipient of the transferred data, such as an email message, a text message, a telephone message or call, or other suitable messages. In one exemplary embodiment, the data transfer can include data that allows certain equipment to function, such as where the data defines a period in which drainage pump should operate based upon an amount of rainfall, the data can identify transfer of compensation, or other suitable data can be transmitted.

If it is determined at 216 that the event parameters are not equal to or greater than the event constant, the method proceeds to 220 where it is determined whether the event parameters are less than or equal to an event threshold, such as a threshold at which the data transfer will not be generated. If it is determined at 220 that the event parameters are less than or equal to the event threshold, the method proceeds to 222 where a no transfer message is generated. Otherwise, the method proceeds to 224 where the data is modified. In one exemplary embodiment, the data can be modified by an amount based on the difference between the event constant and the event parameter that is not less than or equal to the event threshold. For example, where the drainage pump is set to run for a predetermined period of time based on a level of rainfall, the length of time can be modified based upon a threshold level of operation and an actual measured parameter. Likewise, where an amount of compensation is set to be modified based upon the difference between a threshold and a constant event parameter, the compensation can be modified or other suitable functions can be performed. The method then proceeds to 226 where data is transferred between a data origination system and a data destination system. In addition, a message can be generated notifying a recipient of the transferred data, such as an email message, a text message, a telephone message or call, or other suitable messages. In one exemplary embodiment, once the data is transferred, the party having access to the data can no longer modify the data, whereas the party to which the data has been transferred can have access to the data and can use the data, modify the data, or delete the data as desired. For example, data can be used to determine a destination at which to proceed to after a completion of an event, data can be used to identify the location at which goods or services should be procured, data can identify an amount of compensation, or other suitable processes can be used.

If it is determined at 212 that the time is not less than or equal to the time constant, then the method proceeds to 228 where it is determined whether the event parameter has been met or is greater than the event parameter constant. If it is determined that the event parameter is equal to or greater than the event parameter constant, the method proceeds to 230 where the data is modified based on the differential between the time limit and the time constant. The method then proceeds to 232 where the data is transferred as previously described. In addition, a message can be generated notifying a recipient of the transferred data, such as an email message, a text message, a telephone message or call, or other suitable messages.

If it is determined at 228 that the event parameters are not greater than or equal to the event constant, the method proceeds to 234 where it is determined whether the event parameters are less than or equal to an event parameter threshold. If it is determined that an event parameter threshold has not been met, the method proceeds to 240 where a no transfer message is generated. Otherwise, the method proceeds to 236 where the data is modified based upon differentials between the time constant, the time limit, the actual time, the event parameters, the event limits or thresholds and the actual parameters or other suitable data. The method then proceeds to 238 where the data is transferred. In addition, a message can be generated notifying a recipient of the transferred data, such as an email message, a text message, a telephone message or call, or other suitable messages.

In operation, method 200 allows events to be defined based on predetermined time, destination, and other suitable event parameters. Based upon the value of time and parameter characteristics and measurements, messages are generated and data is transferred based upon predetermined levels or functions.

Figure 3:
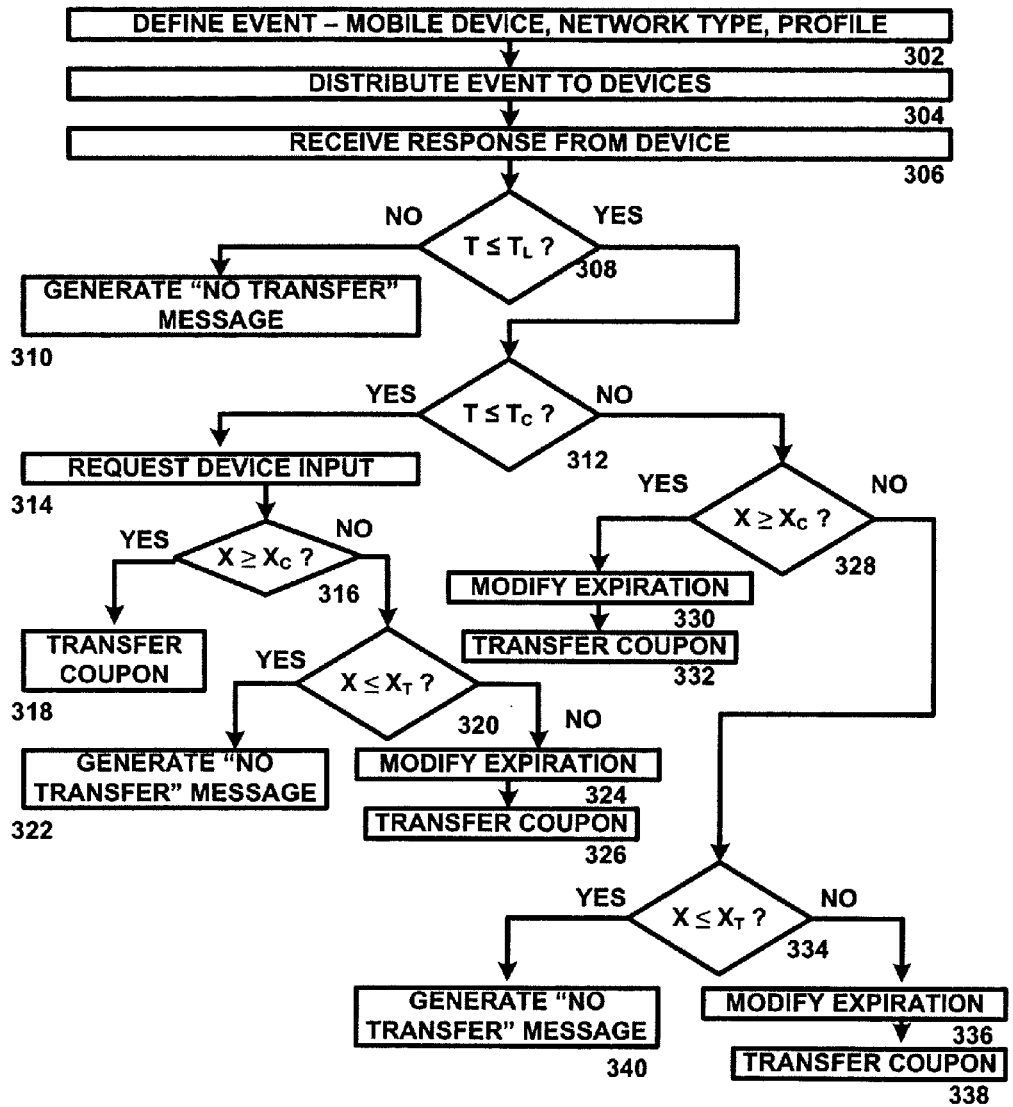
FIG. 3 is a diagram of a method for event and data management in a local wireless network, in accordance with an exemplary embodiment of the present invention.

FIG. 3 is a diagram of method 300 for event and data management in a local wireless network, in accordance with an exemplary embodiment of the present invention. Method 300 allows event data to be managed so as to allow events occurring in the local wireless network to be defined in terms of variables such as time, destination, and event parameters.

Method 300 begins at 302 where an event in a local wireless network is defined. In one exemplary embodiment, the event can include a time limit, such as based on the amount of time that a traveling user will typically take to travel through the network, a time constant that defines when an active user is expected to respond to a query by, and other suitable data. Likewise, a destination for receipt of the event functions can be defined, such as a user profile for users that are to receive coupons or other incentives, as well as the destination for occurrence of the event or other parameters, such as the identity of a store that the coupons or incentives will be good at.

For example, one local store in a chain may want to transmit an incentive to users having a mobile wireless device that are traveling through the store's local wireless network, so as to motivate the user to enter the store and make an impulse purchase. Likewise, that local store may want or need to limit the incentive 1) to users that have an account with the chain (requiring a message and a response), such as a "purse" on a debit card, 2) to users having a frequent buyer membership and/or level of participation (e.g., Gold, Platinum, etc.), 3) to use at the specific local store (and excluding any other stores in the chain), or to otherwise impose limitations. The method then proceeds to 304.

At 304 the event function is distributed to mobile wireless devices. The mobile wireless devices that receive the event function can include all devices, those defined as part of the event function, or other suitable devices. In one exemplary embodiment, distribution to a mobile wireless devices can be performed as a function of the event function itself, such as where the event function is transmitted to a mobile wireless device only after a profile for a user of the device is received. The method then proceeds to 306.

At 306 a response from the mobile wireless device is received. In one exemplary embodiment, the response can include a response to a text message, a response to a device prompt to determine whether the device is still present, or other suitable responses. The method then proceeds to 308.

At 308 it is determined whether a time is less than a time limit. In one exemplary embodiment, if the time is not less than a time limit, then the time has reached an expiration point where the user has left the local wireless network, such that no further transfer of data should be performed. If the time exceeds the time limit, the method proceeds to 310 where a no transfer message is generated, such that no transfer of data occurs. Likewise, if it is determined that the time is less than or equal to the time limit, the method proceeds to 312.

At 312, it is determined whether the time is less than or equal to a time constant, such as a time at which the mobile wireless device user should respond by if they are monitoring their device. If it is determined that the time is less than the time constant, then the method proceeds to 314 where device input is requested. In one exemplary embodiment, the device input can include a "last chance" query (such as providing the user with a last chance to claim a coupon or other incentive), a query to determine whether the user would like to receive the coupon or other incentive, or other suitable queries. The method then proceeds to 316.

At 316, it is determined whether the event parameters are greater than or equal to an event constant for each parameter. For example, if the event parameter is a frequent buyer program membership or participation level, it can be determined whether the user has the requisite membership or participation level. Likewise, it can be determined whether the user of the mobile wireless device has previously been in the area and has not responded to incentives, whether the user of the mobile wireless device has a "purse" associated with the store or chain in a debit account, or other suitable parameters. If it is determined that the event parameters are greater than or equal to the event constant for each parameter at 316, the method proceeds to 318 where a coupon or other incentive is transferred. In addition, a message can be generated notifying a recipient of the transferred data, such as an email message, a text message, a telephone message or call, or other suitable messages. In one exemplary embodiment, the transfer can include data that limits the coupon to certain times, certain stores, or other suitable data can be transmitted.

If it is determined at 316 that the event parameters are not equal to or greater than the event constant, the method proceeds to 320 where it is determined whether the event parameters are less than or equal to an event threshold, such as a threshold at which the data transfer will not be generated. For example, if the user has requested not to receive incentives, is not a frequent buyer member or does not have a debit account purse, then transfer of an incentive may be stopped. If it is determined at 320 that the event parameters are less than or equal to the event threshold, the method proceeds to 322 where a no transfer message is generated. Otherwise, the method proceeds to 324 where the coupon is modified. In one exemplary embodiment, the coupon can be modified to create an incentive for a user that is not a frequent buyer program member to register. The method then proceeds to 326 where coupon is transferred, such as between a data origination system storing the coupon data and a data destination system storing the user's account data. In addition, a message can be generated notifying a recipient of the transferred data, such as an email message, a text message, a telephone message or call, or other suitable messages.

In another exemplary embodiment, once the data is transferred, the party having access to the data can no longer modify the data, whereas the party to which the data has been transferred can have access to the data and can use the data, modify the data, or delete the data as desired. For example, the data can include a credit to a user account for wireless data network access, such as to allow a user to access the Internet for a predetermined period of time at any point in the future if a purchase is made, or other suitable processes can be used.

If it is determined at 312 that the time is not less than or equal to the time constant, then the method proceeds to 328 where it is determined whether the event parameter has been met or is greater than the event parameter constant. If it is determined that the event parameter is equal to or greater than the event parameter constant, the method proceeds to 330 where the data is modified, such as to provide a user with a "last chance" offer, to provide the user with a chain coupon of lesser value that is valid at any store in the chain, or in other suitable manners. The method then proceeds to 332 where the coupon or incentive is transferred as previously described. In addition, a message can be generated notifying a recipient of the transferred data, such as an email message, a text message, a telephone message or call, or other suitable messages.

If it is determined at 328 that the event parameters are not greater than or equal the event constant, the method proceeds to 334 where it is determined whether the event parameters are less than or equal to an event parameter threshold. If it is determined that an event parameter threshold has not been met, the method proceeds to 340 where a no transfer message is generated. Otherwise, the method proceeds to 336 where the coupon or incentive is modified, such as to provide a coupon or incentive to members of the general public if it is determined that the user does not have a frequent buyer membership, a debit account purse, or otherwise does not meet event parameter constants but exceeds event parameter thresholds. The method then proceeds to 338 where the modified incentive or coupon is transferred. In addition, a message can be generated notifying a recipient of the transferred data, such as an email message, a text message, a telephone message or call, or other suitable messages.

In operation, method 300 allows data to be transferred to wireless device users in a local wireless network, such as to provide such users with an incentive or coupon to make a purchase at a vendor that is operating the local wireless network. Method 300 allows the user profile for such users to be determined, allows decisions to be made without manual input as to whether to provide the user with a credit transfer versus a time-limited coupon, and provides other message functions that utilize time, device, and event parameters to select or modify messages.

Figure 4:
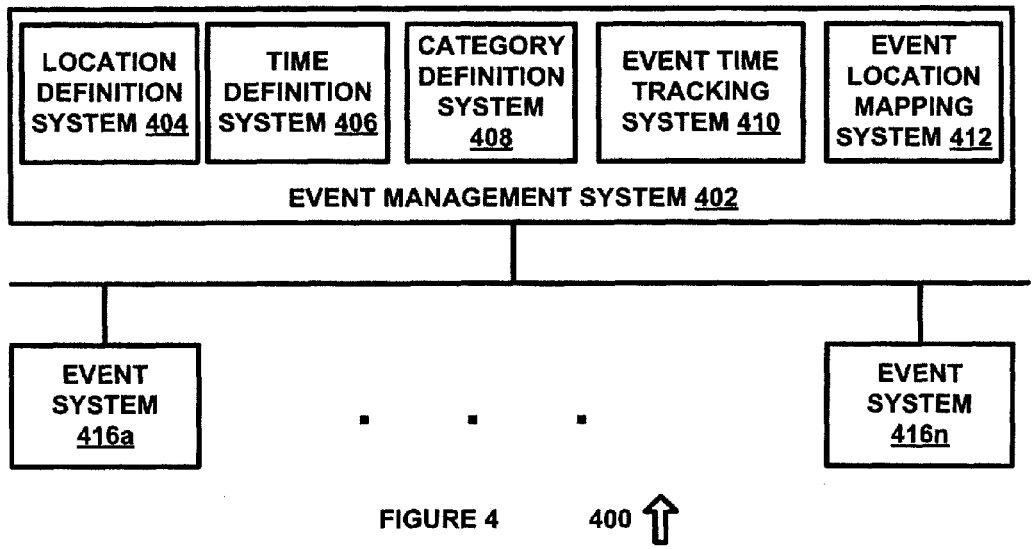
FIG. 4 is a diagram of a system for event management in accordance with an exemplary embodiment of the present invention.

FIG. 4 is a diagram of system 400 for event management in accordance with an exemplary embodiment of the present invention. System 400 allows event management to be performed, such as where events are defined and reported.

System 400 includes event management system 402, which further comprises location definition system 404, time definition system 406, category definition system 408, event time tracking system 410, event location mapping system 412, and event systems 416a through 416n, each of which can be implemented in hardware, software, or a suitable combination of hardware and software, and which can be one or more software systems operating on a general purpose processing platform. Location definition system 404 allows a location to be defined for an event, such as by defining one or more event systems 416a through 416n within a location where an event can occur. In one exemplary embodiment, a user can define a location where an event can occur by restricting the event to event systems within a geographic area, within a radius from a reference point, or in other suitable manners. In this exemplary embodiment, if an event performer attempts to perform the event at an event system that is outside of the allowed location, the event performer is prevented from performing the event, such as obtaining an item, providing information, accessing a system over a network, or other suitable events.

Time definition system 406 allows a time to be defined for an event, such as by allowing a user to define a time period during which an event can be performed, a time period during which an event cannot be performed, or in other suitable manners. In this exemplary embodiment, if an event performer attempts to perform the event at a time that is outside of the allowed time period, the event performer is prevented from performing the event, such as obtaining an item, providing information, accessing a system over a network, or other suitable events.

Category definition system 408 allows a category to be defined for an event, such as by defining a category associated with one or more event systems 416a through 416n where an event can occur. In one exemplary embodiment, a user can define a category where an event can occur by restricting the event to event systems associated with a predetermined category, restricting the event from occurring at event systems associated with a predetermined category, or in other suitable manners. In this exemplary embodiment, if an event performer attempts to perform the event at an event system that is not associated with a permitted category, the event performer is prevented from performing the event, such as obtaining an item, providing information, accessing a system over a network, or other suitable events.

Event time tracking system 410 tracks events, such as by receiving notification of an event from an event system and storing the event-related data, such as the event performer, the event system location, the date and time of the event, the goods or information obtained or provided by the event performer, or other suitable data. Event time tracking system 410 can further generate a display for user-selected sets of event data, such as a calendar showing the dates on which events were performed, a list of events by category, a list of attempts by an event performer to perform an event at a non-compliant event system, or other suitable information.

Event location mapping system 412 generates a map showing the location of one or more events. In one exemplary embodiment, event location mapping system 412 can also generate a path between events based on the event time, such as to show the path taken by an event performer. Event location mapping system 412 can also generated information relating to event systems, such as by generating a zone associated with location definition system 404, showing event systems where non-compliant events were attempted, or other suitable information.

In operation, system 400 is used to manage events so as to allow events to be performed at predetermined event systems, at predetermined times, and in predetermined locations. System 400 allows a user to track performance of events, such as by charting the events on a calendar, map, or in other suitable manners.

Figure 5:
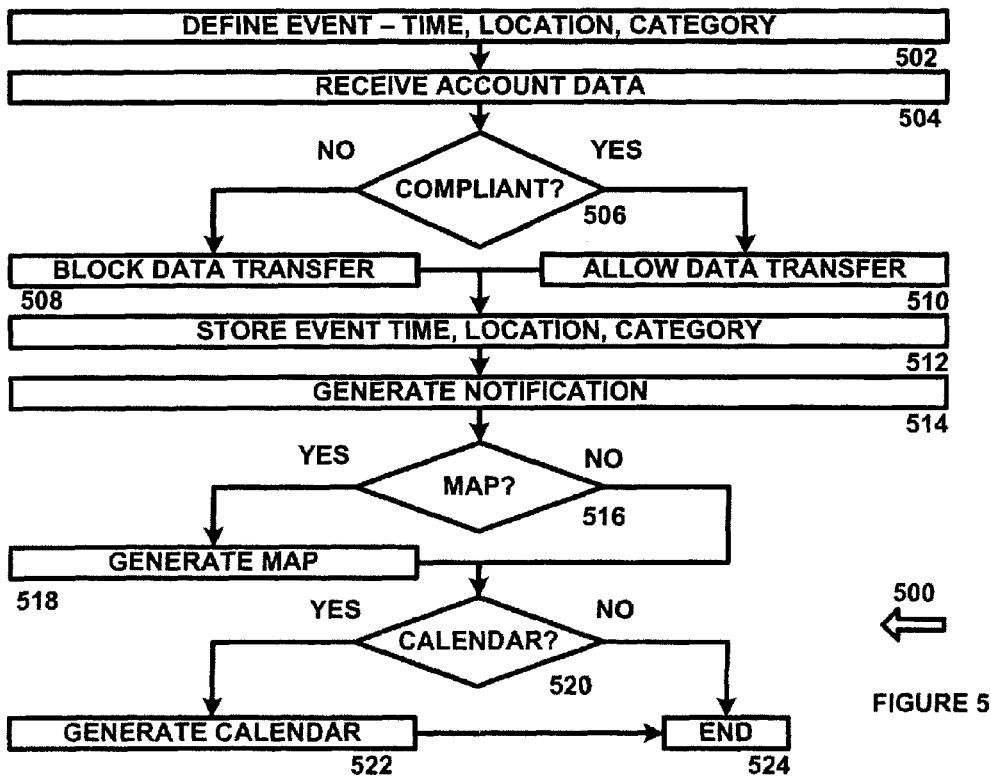
FIG. 5 is a flow chart of a method for event management in accordance with an exemplary embodiment of the present invention.

FIG. 5 is a flow chart of method 500 for event management in accordance with an exemplary embodiment of the present invention. Method 500 begins at 502 where an event is defined. In one exemplary embodiment, an event is defined by specifying the location of event systems where an event can occur, a time during which an event can occur, a category associated with an event system where an event is allowed to occur, or by defining the event in other suitable manners. The method then proceeds to 504.

At 504, account data is received at an event system. In one exemplary embodiment, the account data can be provided by an event performer to obtain access to a communications medium, credit account data can be provided, or other suitable account data is provided. The method then proceeds to 506, where it is determined whether an event can be performed in compliance with the event definition. For example, if the event performer has provided account data to an event system that is outside of an allowed location, that is after a time period when the event is supposed to occur, or that is at an event system associated with a category where the event is not allowed, the method proceeds to 508 where data transfer is blocked. Otherwise, the method proceeds to 510 where data transfer is allowed, such as access to a data network, a credit network, or other suitable data transfer. The method then proceeds to 512.

At 512, the parameter's for an event are stored, such as the time, location, associated categories, whether the event was compliant or non-compliant, any event-related data that was transferred, or other suitable data. The method then proceeds to 514 where notification data is generated. In one exemplary embodiment, the notification data can include an email, voice mail, text message, or other suitable notification of the event. The method then proceeds to 516.

At 516, it is determined whether a map has been requested. If a map has not been requested, the method proceeds to 520, otherwise the method proceeds to 518 where the map is generated. In one exemplary embodiment, a plurality of events can be mapped and a route between the events can be generated, such as to show the sequence in which the events occurred. The method then proceeds to 520.

At 520, it is determined whether a calendar has been requested. If a calendar has not been requested, the method ends at 524, otherwise the method proceeds to 522 where a calendar is generated. In one exemplary embodiment, the calendar can display events that occurred on each day, event-related data, or other suitable data. The method then proceeds to 524 and terminates.

In operation, method 500 allows events to be managed and allows a user to obtain event-related data in a suitable reporting format.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. An apparatus comprising:
a data processing system configured to receive an event function from an event initiator and a time constant associated with a class of devices;
to receive a task description;
to receive a quantitative task parameter;
to distribute the event function, the task description and the quantitative task parameter to one or more destinations associated with an event performer;
to receive a response message as a function of destination and time;
to determine whether the time is less than or equal to a limit time;
to determine whether the quantitative task parameter has been met by the event performer; and
to transfer data from a data origination system accessible by the event initiator to a data destination system accessible by the event performer if the event parameter is greater than or equal to the event constant, if the time is less than or equal to the limit time and if the quantitative task parameter has been met by the event performer by transferring funds from an account of the event initiator to an account of the event performer if a number of tasks have been completed within a predetermined time period.

2. The apparatus of claim 1 wherein receiving the response message as the function of the destination and the time comprises receiving a message from the event performer that a task associated with the event has been completed.

3. The apparatus of claim 1 wherein determining whether the time is less than or equal to the limit time comprises determining whether a time associated with performance of a task is within a predetermined period for performing the task.

4. The apparatus of claim 1 wherein determining whether the quantitative task parameter has been met by the event performer comprises determining whether the event performer has performed a predetermined number of tasks.

5. The apparatus of claim 1 wherein the data processing system is configured to:
establish a session over the local wireless network with a receiving device in a class of devices; and
distributing a data message to the receiving device based on the time constant.

6. The apparatus of claim 1 wherein the data processing system is configured to receive an identification of a specific event performer to send a message to.

* * * * *